United States Patent
Knapp et al.

(10) Patent No.: US 12,437,002 B2
(45) Date of Patent: Oct. 7, 2025

(54) METHOD AND SYSTEM FOR MANAGING ANALYSIS OF OMICS DATA BASED ON A USER QUERY

(71) Applicant: Aseesa LLC, South San Francisco, CA (US)

(72) Inventors: Johannes Knapp, Stuttgart (DE); Aditi Bhargava, Hillsborough, CA (US)

(73) Assignees: Aseesa LLC, South San Francisco, CA (US); Aseesa LLC, Hillsborough, CA (US)

( * ) Notice: Subject to any disclaimer, the term of this patent is extended or adjusted under 35 U.S.C. 154(b) by 0 days.

(21) Appl. No.: 17/945,112

(22) Filed: Sep. 15, 2022

(65) Prior Publication Data
US 2024/0095284 A1    Mar. 21, 2024

(51) Int. Cl.
G06F 16/904    (2019.01)
G06F 16/9038   (2019.01)
G06F 16/907    (2019.01)
G16B 25/00     (2019.01)

(52) U.S. Cl.
CPC ........ *G06F 16/904* (2019.01); *G06F 16/9038* (2019.01); *G06F 16/907* (2019.01); *G16B 25/00* (2019.02)

(58) Field of Classification Search
CPC .. G06F 16/904; G06F 16/9038; G06F 16/907; G16H 10/40; G16B 50/30
See application file for complete search history.

(56) References Cited

U.S. PATENT DOCUMENTS

| | | | |
|---|---|---|---|
| 9,092,860 B2* | 7/2015 | Van Muiswinkel | G06T 7/33 |
| 11,328,796 B1* | 5/2022 | Jain | G16H 10/20 |
| 2015/0112708 A1* | 4/2015 | Heniford | G16H 15/00 705/2 |
| 2018/0357375 A1* | 12/2018 | Cutcliffe | G16B 40/30 |
| 2019/0156241 A1* | 5/2019 | Hughes | G06F 16/25 |
| 2021/0194580 A1* | 6/2021 | Das | G06V 30/142 |
| 2021/0319907 A1* | 10/2021 | Harley | G16H 50/70 |
| 2021/0407674 A1* | 12/2021 | Winkel | G06N 3/08 |
| 2022/0208305 A1* | 6/2022 | Bontrager | G16H 15/00 |
| 2022/0208540 A1* | 6/2022 | Behsaz | H01J 49/0036 |
| 2023/0060467 A1* | 3/2023 | Mcdonnell | G16B 30/00 |
| 2023/0153921 A1* | 5/2023 | Smith | G06Q 50/01 707/736 |
| 2023/0258635 A1* | 8/2023 | Lowery, III | G01N 33/56972 435/6.11 |
| 2023/0352187 A1* | 11/2023 | Schaper | G16H 50/20 |

* cited by examiner

*Primary Examiner* — Kris E Mackes
(74) *Attorney, Agent, or Firm* — Dana Legal Services; Jubin Dana

(57) ABSTRACT

A method for analyzing a dataset of biological measurement sample, the method comprises examining the dataset to enable or disable a set of configuration options from a plurality of configuration options, converting the dataset into a high-performance format, receiving a query that includes at least one query symbol, for which the dataset is to be searched, analyzing the dataset based on the query, and generating an output that is responsive to the query.

20 Claims, 11 Drawing Sheets

FIG. 2A

| GSE171964_countsmatrix_v2.mtx | | |
|---|---|---|
| [symbol index] | [barcode index] | [value/transcript count] |
| 12 | 1 | 2 |
| 15 | 1 | 1 |
| 24 | 1 | 1 |
| 26 | 1 | 1 |
| 32 | 1 | 1 |
| 48 | 1 | 1 |
| 59 | 1 | 1 |
| 78 | 1 | 12 |
| 86 | 1 | 1 |
| 102 | 1 | 1 |
| 128 | 1 | 1 |

FIG. 2B

```
Counted transcripts in 0.38263 seconds
Completed analysis in 0.004444 seconds
Printing results for query <FENGeneSearchQuery: 0x600001241b90, querySymbols = [STAT1, STAT3],
controlVariable = FENQueryVariableDaysSinceIntervention, controlCutoff = 1, testVariable =
FENQueryVariableDaysSinceIntervention, testGroups = {
    [Group 0] "1": 1-2
    [Group 1] "2": 2-3
    [Group 2] "7": 7-8
    [Group 3] "21": 21-22
    [Group 4] "22": 22-23
    [Group 5] "28": 28-29
    [Group 6] "42": 42-43
}, calculationTarget = FENCalculationTargetGeneExpression, calculationMode =
FENCalculationModeRelative, normalizationMode = FENNormalizationModeCellCount, comparisonMode =
FENComparisonModeIndividualVsAverage, calculationDescription = Change in Transcripts per Cell
(tpc) (log_{2} fold change vs control, V/A)>

-- Raw values:
STAT1/Control Group [Transcript Count (TC)] = {
    CD14+-Monocytes-(C3) =    {
        "2047_CD14+-Monocytes-(C3)_0" = 1136;
        "2049_CD14+-Monocytes-(C3)_0" = 1178;
        "2051_CD14+-Monocytes-(C3)_0" = 801;
        "2052_CD14+-Monocytes-(C3)_0" = 440;
        "2053_CD14+-Monocytes-(C3)_0" = 1118;
        "2055_CD14+-Monocytes-(C3)_0" = 733;
    };
    CD16+-Monocytes-(C4) =    {
        "2047_CD16+-Monocytes-(C4)_0" = 173;
        "2049_CD16+-Monocytes-(C4)_0" = 327;
        "2051_CD16+-Monocytes-(C4)_0" = 394;
        "2052_CD16+-Monocytes-(C4)_0" = 391;
        "2053_CD16+-Monocytes-(C4)_0" = 794;
        "2055_CD16+-Monocytes-(C4)_0" = 261;
    };
}   STAT1/Control Group [Positive Cell Count (CC)] = {
    CD14+-Monocytes-(C3) =    {
        "2047_CD14+-Monocytes-(C3)_0" = 501;
        "2049_CD14+-Monocytes-(C3)_0" = 456;
        "2051_CD14+-Monocytes-(C3)_0" = 348;
        "2052_CD14+-Monocytes-(C3)_0" = 292;
        "2053_CD14+-Monocytes-(C3)_0" = 412;
        "2055_CD14+-Monocytes-(C3)_0" = 245;
    };
    CD16+-Monocytes-(C4) =    {
        "2047_CD16+-Monocytes-(C4)_0" = 77;
        "2049_CD16+-Monocytes-(C4)_0" = 162;
        "2051_CD16+-Monocytes-(C4)_0" = 200;
        "2052_CD16+-Monocytes-(C4)_0" = 261;
        "2053_CD16+-Monocytes-(C4)_0" = 314;
        "2055_CD16+-Monocytes-(C4)_0" = 77;
    };
```

FIG. 2C-1

```
}     STAT1/Test Group 0 [TC] = {
   CD14+-Monocytes-(C3) =      {
      "2047_CD14+-Monocytes-(C3)_1" = 753;
      "2049_CD14+-Monocytes-(C3)_1" = 2352;
      "2051_CD14+-Monocytes-(C3)_1" = 2728;
   };
   CD16+-Monocytes-(C4) =      {
      "2047_CD16+-Monocytes-(C4)_1" = 1304;
      "2049_CD16+-Monocytes-(C4)_1" = 1085;
      "2051_CD16+-Monocytes-(C4)_1" = 1999;
   };
}     STAT1/Test Group 0 [CC] = {
   CD14+-Monocytes-(C3) =      {
      "2047_CD14+-Monocytes-(C3)_1" = 753;
      "2049_CD14+-Monocytes-(C3)_1" = 2352;
      "2051_CD14+-Monocytes-(C3)_1" = 2728;
   };
   CD16+-Monocytes-(C4) =      {
      "2047_CD16+-Monocytes-(C4)_1" = 1304;
      "2049_CD16+-Monocytes-(C4)_1" = 1085;
      "2051_CD16+-Monocytes-(C4)_1" = 1999;
   };
}     STAT1/Test Group 1 [TC] = {
[...]

-- Normalized values:
STAT1/Control Group [norm] = {
   "1.184348931615461",
   "1.487154150197628",
   "0.441317047265002b",
   "1.164598747330961",
   "2.267281105990783",
   "1.681618293755497"
}     STAT1/Test Group 0 [norm] = (
   "5.865187713310b8",
   "3.288100208768267",
   "3.350162866449511"
)     STAT1/Test Group 1 [norm] = (
[...]

-- Expression compared to control group:
STAT1     1.64988176  ±0.387384537    1.23847395  ±0.325481561     0.085599375  ±0.579011591
          0.8476047688 ±0.687752547   1.65281771  ±0.725267075     0.519638645  ±1.37724653
          0.19538416  ±0.62880517
STAT3     0.25983414  ±0.8642875191   0.246299736 ±0.14719857      0.122118072  ±0.166990653
          0.0236955067 ±0.200949626   0.675845371 ±0.360129379     0.488895181  ±0.595847043
          0.247885523 ±0.265451742

-- Abundance for cell type:
{
   STAT1 =     {
      "CD14^{+} Monocytes (C3)" = "2.751862764616857";
      "CD16^{+} Monocytes (C4)" = "2.508923865123573";
```

FIG. 2C-2

```
    };
    STAT3 =    {
        "CD14^{+} Monocytes (C3)" = "1.485882052601784";
        "CD16^{+} Monocytes (C4)" = "1.446476599010627";
    };
}

-- Statistical analysis:
STAT1:
t = 3.83, significanceString = *
t = 4.21, significanceString = **
t = -0.0188, significanceString = (none)
t = -0.0958, significanceString = (none)
t = 3.2, significanceString = *
t = 1.51, significanceString = (none)
t = 0.979, significanceString = (none)

STAT3:
t = 3.34, significanceString = **
t = 1.59, significanceString = (none)
t = 0.605, significanceString = (none)
t = -0.089, significanceString = (none)
t = 3.03, significanceString = **
t = 1.94, significanceString = *
t = 1.73, significanceString = (none)

-- Number of samples per group:
STAT1 (3,12/100.0%,100.0%)   (5,12/100.0%,100.0%)   (5,12/100.0%,100.0%)   (5,12/100.0%,100.0%)
      (6,12/100.0%,100.0%)   (6,12/100.0%,100.0%)   (6,12/100.0%,100.0%)
STAT3 (3,12/100.0%,100.0%)   (5,12/100.0%,100.0%)   (5,12/100.0%,100.0%)   (5,12/100.0%,100.0%)
      (6,12/100.0%,100.0%)   (6,12/100.0%,100.0%)   (6,12/100.0%,100.0%)

-- Correlation:
STAT1
STAT1  1
STAT3  0.806105
STAT3
STAT1  0.806105
STAT3  1
```

FIG. 2C-3

METHOD AND SYSTEM FOR MANAGING ANALYSIS OF OMICS DATA BASED ON A USER QUERY

TECHNICAL FIELD

The present disclosure relates to medical devices and more specifically to data analytics systems to efficiently evaluate high-throughput deoxyribonucleic acid (DNA) gene sequencing data in ribonucleic acid (RNA), identify functional organic compounds, and visualize data associated with the functional organic compounds.

BACKGROUND

Omics is a general term used to denote disciplines in biology, such as genomics, proteomics, or metabolomics. Research in the omics-based disciplines is focused on the collective characterization and quantification of an organism's genes, proteins, and metabolites and their interrelations and influence on organisms, cells, and tissues.

Advances in DNA sequencing methods, referred to in the scientific community as Next Generation Sequencing (NGS) or high-throughput gene sequencing methods, have triggered a revolution in discovery-based research. Using high-throughput gene sequencing methods an entire human genome can be sequenced within a single day. High-throughput gene expression data is generated using "[m]odern high throughput sequencing technologies" that "are able to generate huge amounts of data that renders impossible to analyze manually," Shakri Banerjee, Damayanti Chakravarti, Sayak Ganguli, Susanta Roychoudhury, "CANCER AND NONCODING RNAs, 2018," ScienceDirect, Academic Press, see URL https://www.sciencedirect.com/science/article/pii/B9780128110223000255.

The National Center for Biotechnology Information (NCBI) provides access to 38 databases covering a variety of biomedical data, including nucleotide and protein sequences, gene records, three-dimensional molecular structures, and associated biomedical literature. The databases include a Gene Expression Omnibus (GEO) database system.

The GEO database system is an "international public repository that archives and freely distributes microarray, next-generation sequencing, and other forms of high-throughput functional genomics data submitted by the research community." The NCBI website provides instructions for formatting and submitting data samples and instructions for searching curated datasets, see the URL https://www.ncbi.nlm.nih.gov/geo/, specifically, the sections entitled "Getting Starting," "Tools," "Browse for Content," and "Information for Submitters." See the National Center for Biotechnology Information (NCBI) website at URL:

https://www.ncbi.nlm.nih.gov/geo/info/overview.html.

In essence, the instructions describe that the data should be submitted in a categorized form according to GEO records {datasets, series, biological platforms, and samples} and with an accompanying user provided general description. The website goes on to state that "[s]elected original records undergo an upper-level of rendering [a curation process] into dataset and gene profile records" that are then made available for public access, see URL "https://www.ncbi.nlm.nih.gov/geo/info/overview.html."

A web-based user interface is provided to search omics-based datasets and profiles (original and curated submission records) in the GEO database system by dataset, series, platform, and sample. The NCBI website also includes documentation regarding several server-side programs, referred to as "E-Utilities," and their application protocol interface (API) parameters that can be used by application developers to develop applications to search datasets and profiles in the GEO database system, see the URL "https://www.ncbi.nlm.nih.gov/books/NBK25501" for more information regarding the utilities.

Technical problems with the GEO database are that the curation process of the datasets is performed as a $3^{rd}$ party service that is limited by the accompanying general description and knowledge of the person or persons performing the service. Additionally, the datasets are not managed in a manner that ensures the integrity of the datasets as it relates to correlation and application to other datasets.

Furthermore, the datasets are considered highly complex in that the variables between datasets can have many correlations. The datasets are also considered big or big and wide datasets and by industry terms have millions of rows or millions of rows and columns of variables. Integrity of the data is very important as performing complex operations on this amount and type of data can be resource intensive.

Additionally, the application protocol interfaces used to access the E-Utilities are numerous and the supporting technology needed to use these interfaces for specific scientific applications have been underdeveloped. As such, use of these API's can be complex and require expertise in systems administration, systems engineering, and software development.

The limitations result in analytic inaccuracies, processing and communication inefficiencies, limited use, and unrecognized scientific applications. These limitations result in an increase in research and development costs and prevent, limit, and hinder access to and use of critical research data thereby impeding medical progress.

SUMMARY

The following presents a simplified summary of various aspects described herein. This summary is not an extensive overview and is not intended to identify required or critical elements or to delineate the scope of the claims. The following summary merely presents some concepts in a simplified form as an introductory prelude to the more detailed description provided below.

Embodiments of the disclosure address these and/or other technical limitations by providing a system and method for implementing a data preprocessor and analytics component configured to construct complex database queries and analytics commands using general information, transcode big datasets, search and perform complex analytics on the transcoded datasets, and provide an interactive graphic user interface for exploring and configuring datasets and associated parametric data.

Presented herein is a system comprising: a processor; a memory in communication with the processor; an input device in communication with the processor; and a graphical-user display (GUI) in communication with the processor, wherein the memory stores code that is executed by the processor to cause the system to: receive a user-specified query containing one or more symbols and configuration options, which is provided by a user through the input device; retrieve a dataset from a database that includes biological measurement data; examine the dataset to select, either by enabling or disabling, a set of configuration options from a plurality of configuration options; convert the dataset into a high-performance format for analysis; analyze the dataset based on the query; and generate an output that is responsive to the query.

Also presented herein is a method for analyzing a dataset of a biological measurement sample. The method comprises examining the dataset to enable or disable a set of configuration options from a plurality of configuration options; converting the dataset into a high-performance format; receiving a query that includes at least one query symbol, for which the dataset is to be searched; analyzing the dataset based on the query; and generating an output that is responsive to the query.

In some embodiments, the dataset includes dataset kind and metadata. In some of these embodiments, the dataset is genome sequences obtained from a database, including at least one of GEO database and/or Omics database. In other embodiments, each measurement recorded in the dataset includes auxiliary data related to measurement associated with the dataset. In some other embodiments, the auxiliary data is at least one of a date, a subject's age, a subject's body mass index (BMI), a subject's sex, a subject's gender.

In some embodiments, each measurement recorded in the dataset includes a measured value for at least one biological parameter denoted by a symbol. In some other embodiments, the measured value includes at least a count or a concentration or a peak value. In yet other embodiments, the measured values for a sub-measurement for a single cell is denoted by a string, which includes at least one of a barcode or a UMI, that is associated with additional metadata, which includes at least one of barcode metadata.

In some embodiments, the barcode metadata includes cell type. In some other embodiments, the output is a visual presentation showing results for one or more user-specified test groups. In yet still other embodiments, the visual presentation includes, based on the query, one or more of: absolute value graphical representation; relative value graphical representation; average-to-average comparison graphical representation; value-to-average comparison graphical representation; value-to-value comparison graphical representation; value bars showing an average value of the analyzed test group; value labels; error bars showing the standard deviation of the analyzed test group; and text denoting significance of the output for the analyzed test group.

In some embodiments, the visual representation is provided on a display and the visual representation is based on the query and selected options. In yet other embodiments, the user query includes chart configuration and an optional normalization mode. In yet some other embodiments, criteria are used to determine if a measurement for a test group is to be included in the analysis.

In some embodiments, the criteria are defined to include at least one metadata value, enumeration types, and barcode metadata values. In still yet other embodiments, the step of analyzing further comprises the step of summing all sub-measurements for which barcode metadata satisfies criteria specified in the query.

In some embodiments, summing all sub-measurements for which the cell type in the barcode metadata equals one of the cell types specified in the query. In still yet other embodiments, measurements are normalized before summing to create a standardized measurement for different measured values using a normalization mode specified in the query.

In some embodiments, the dataset is in any format including at least one selected from a group consisting of market exchange format (MEX); comma separated value (CSV); and tab separated value (TSV).

In some embodiments, the step of analyzing includes at least one of counting number of sub-measurements whose barcode metadata satisfies criteria specified in the query to generate a cell count chart. In yet other embodiments, the step of analyzing includes calculating the percentage of sub-measurements with nonzero values for the query symbol to generate a quantifiability chart.

In some embodiments, the step of analyzing includes dividing the analysis result for each query symbol of a plurality of query symbol by the result for the query symbol to generate a correlation chart. In still yet other embodiments, any test group is analyzed to determine a most significantly changed pathway in the analyzed test group.

BRIEF DESCRIPTION OF THE DRAWINGS

The foregoing summary as well as the following detailed description is better understood when read in conjunction with the appended drawings. For the purpose of illustrating the invention, there is shown in the drawing's embodiments in accordance with various aspects of the invention. However, the invention is not limited to the specific embodiments and methods disclosed. In the drawing figures:

FIG. 2A is an illustration of a table comprising dataset variables, according to example embodiments.

FIG. 2B is an illustration of the table transformed into an alternative format, according to example embodiments.

FIGS. 2C1-2C3 are illustrations of normalized datasets from the table, according to example embodiments.

FIG. 3 is an illustration of an interactive graphical user interface for interactively exploring normalized dataset variables, according to example embodiments.

DETAILED DESCRIPTIONS

The following describes various examples of the present technology that illustrate various aspects and embodiments of the invention. Generally, examples can use the described aspects in any combination. All statements herein reciting principles, aspects, and examples are intended to encompass both structural and functional equivalents thereof. Additionally, it is intended that such equivalents include both currently known equivalents and equivalents developed in the future, i.e., any elements developed that perform the same function, regardless of structure.

Embodiments of this disclosure provide technical solutions to technical problems by utilizing omics-based experimental profile information, generalized and normalized data management controls, transcoding techniques, classified and tagged dataset variables for use in training algorithmic models, and calibrated, trained algorithmic models in data analytic systems to simplify use, improve processing and communications efficiency, and quality of quantitative results generated thereby.

Advantages of the technical solutions include improved data integrity, streamlined processing and communication, facilitated use of complex analytic systems, and enhanced accuracy thereby resulting in improved computing and communicating efficiency, building of gene-protein network that exist between organs, reduced research and development costs, better prediction of targeted therapeutics for personalized medicine, better prediction of adverse events associated with drugs, and improved scientific discovery times.

Figure 1:
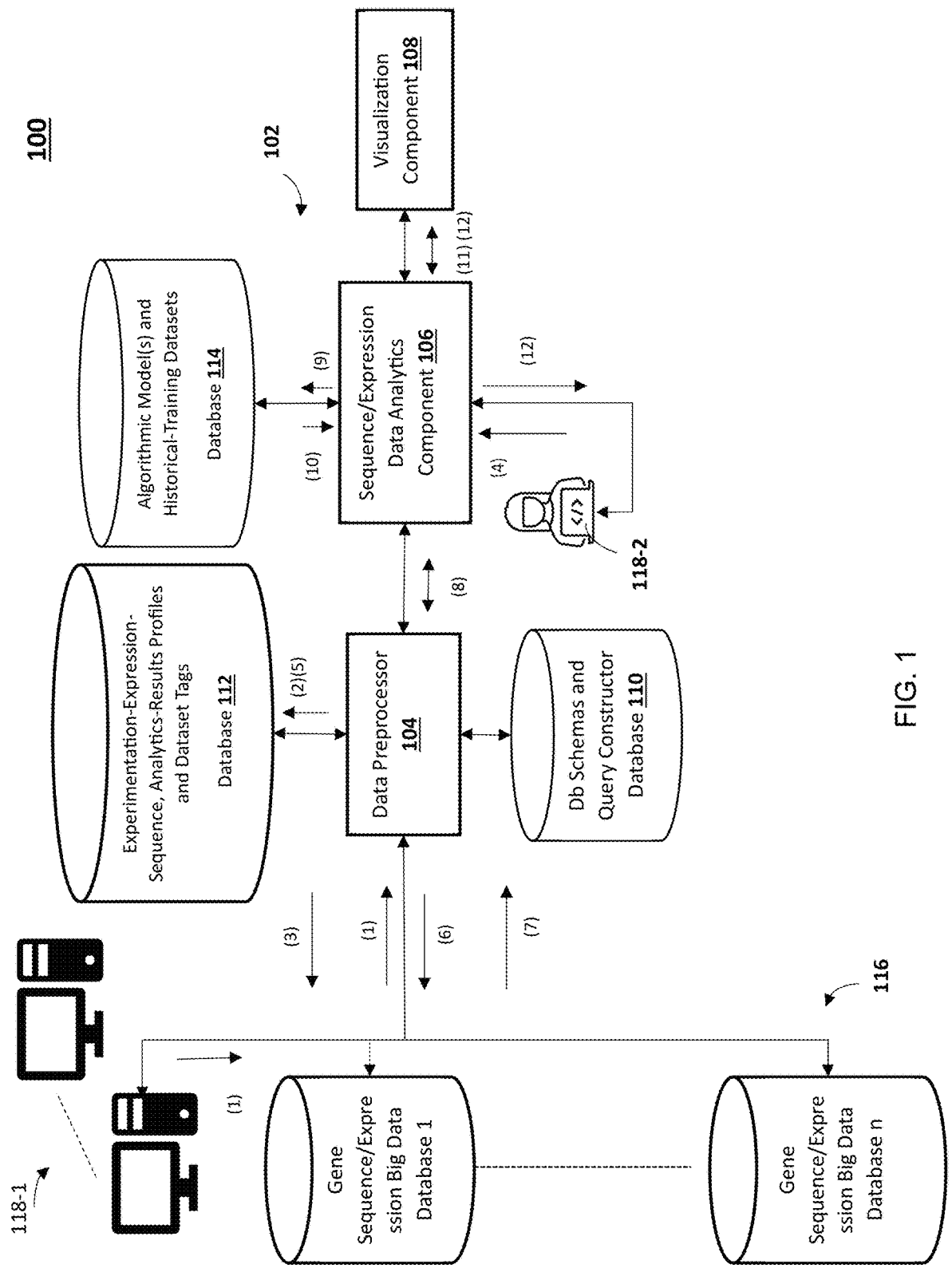
FIG. 1 is an illustration of a block diagram of an analytics system for analyzing datasets associated with research and experimentation of organic materials, according to example embodiments.

FIG. 1 illustrates a block diagram of an analytics system 100 for analyzing datasets associated with research and experimentation of organic materials, according to certain example embodiments. The analytics system 100 can be used to efficiently evaluate high-throughput deoxyribonucleic acid (DNA) gene sequencing data in ribonucleic acid (RNA), identifying functional organic compounds, and visualizing data associated with the functional organic compounds.

Analytics system 100 comprises an analytics component 102 having a data preprocessor 104, a sequence-expression data analytics component 106, and a visualization component 108. Data preprocessor 104 and sequence-expression data analytics component 106 are communicatively coupled to a database schemas and query constructor database 110, an experimentation-expression-sequence, analytics-results profiles, and dataset tags database 112, and an algorithmic model(s) and historical-training datasets database 114. Analytics system 100 also comprises a big, or big and wide, data database system 116 and a plurality of research and experimentation computers 118-1, 118-2. Big data database system 116 comprises gene sequence and expression databases 1-$n$ with a plurality of gene sequence and expression datasets stored therein. The datasets comprise variables (parameters and associated variables). The parameters are also referred to as metadata.

Database 110 comprises various database schemas that detail the database table blueprints, e.g., table, row, and column dependencies, data namespaces, and blueprints and namespace configurations for datasets stored in big database system 116. The database schemas are also referred to as metadata. Metadata are description, configurations, or both associated with variables.

Database 110 also comprises several query constructs for each database type that have been predefined based, e.g., on previously developed and used constructs and constructs particularly useful for the datasets and types of datasets stored in database system 116.

Database 112 comprises experimentation, expression, and sequence profiles. The profiles are provided by researchers and experimenters and are detailed, e.g., based on actual researcher experimentation practices, atypical practices directly related to a particular experimentation, and industry defined guidelines and standards for experimentation types. The profiles may include symbols, e.g., identifying sequences, cells, genes, proteins, etc., and variables provided by the datasets from database 116. The profiles also include details relevant to the expression and sequences, such as a dataset kind, e.g., normal (genes, proteins, metabolites, etc.) and single cell.

The variables may comprise row, column, or both parameter data that describe cell identifiers (barcode identifiers), cell types, molecule types, static or dynamic variable types (i.e. variables that can and cannot be normalized), symbol identifiers, experiment conditions, such as dates, a subject's ages, a subject's body mass index (BMI), a subject's sex, and a subject's gender; and the parameters associated values. The parameters, parameter values, or both can also be referred to as auxiliary data.

Database 112 also comprises analytic profiles and analytic result profiles that provide details of analytics operations, such as linear regression analysis, independent, dependent, and experimental variables, and the results of the analytic operations. Database also comprises a set of dataset tags, i.e., classification labels classified based on a problem domain.

Database 114 comprises at least one algorithmic model and a plurality of datasets. The algorithmic model can be a simple mathematical equation for counting a peak transcripts value in a sequence or a complex AI (Artificial Intelligence) algorithm that can detect dependencies between variables and, therefore, a substance concentration. The datasets can be categorized as historical or tagged data used in training an algorithm, e.g., a linear regression algorithm, using a supervised learning method to fit a model having a particular parameter space. In some embodiments, data preprocessor 104 is configured to process omics-based cell experimentation profile information, omics-based sequence-expression data, and database schemas (1) generated by research-experimentation computers 118-1, 118-2 and database system 116 and store the profile information and schemas (2) in database 112. In some embodiments, data preprocessor 104 generates tags based on a classification system and stores the tagged data in database 114.

In some of these embodiments, data preprocessor 104 is configured to format parametric values of one or more datasets from the gene sequencing data (1) using a standardized method and store the formatted datasets (3) in the big data database system 116. In accordance with some aspects and embodiments, data processor 104 is configured to examine any dataset to select, either by enabling or disabling, a set of configuration options from a plurality of configuration options and convert the dataset into a high-performance format for analysis. In accordance with some aspects and embodiments, the data processor 104 is configures to analyze the dataset based on any query and generate an output that is responsive to the query.

Data preprocessor 104 can process user provided select cell experimentation profile information and generalized research and analytics commands (4) provided by a research-experimentation computer 118-2. Data preprocessor 104 generates one or more Structured Query Language ("SQL") queries using the user provided select cell experimentation profile information and generalized research and analytics commands. Data preprocessor 104 can query (5) database 112 and database 114 for detailed cell experimentation, analytics profile information, and database specific constructs.

Data preprocessor 104 can construct one or more SQL commands using this information and query (6) the big data database system 116. Data preprocessor 104 can process SQL query responses (7) comprising select gene sequence and expression dataset or datasets from the big data database system 116 and send the dataset or datasets, or modified versions thereof, (along with an analytics command) to the analytics component 106 or store the dataset or datasets, or modified versions thereof, in database 114.

Data preprocessor 104 can apply a normalization factor to variables in one or more datasets of the select gene sequence and expression datasets. Data preprocessor 104 can modify the select gene sequence and expression datasets into a processing efficient format, such as converting text format-based data sets to coded binary format-based datasets.

Data preprocessor 104 can generate a detailed analytics command using the detailed analytics profile information. Data preprocessor 104 sends the detailed analytics command (8) to data analytics component 106 or sends the detailed analytics command and the select gene sequence and expression datasets, e.g., the processing efficient format version, to data analytics component 106.

Data analytics component 106 constructs a query based on the detailed analytics command and sends the query (9) to database 114. Analytics component 106 processes the select gene sequence and expression datasets returned in a query response (10) using an algorithmic model, historical dataset, a trained dataset, or any combination thereof based on the detailed analytics command.

In some embodiments, analytics component 106 processes the select gene sequence and expression datasets to evaluate organic material, e.g., DNA genes and transcripts, to identify novel structures that may be useful as compounds for treating disease. Analytics component 106 can identify novel structures by applying mathematical techniques, such as triangulation or statistical modeling techniques, such as linear regression analysis.

In some embodiments, analytics component 106 generates a command comprising presentation data and results from processing the select gene sequence and expression datasets. Analytics component 106 sends the command (11) to visualization component 108. In response, the visualization component 108 generates a graphical representation and sends the graphical representation in a command (12) to researcher and developer computer 105 for display on a display or a graphical user interface (GUI), include that of a handle device or a mobile device or tablet.

In some embodiments, the data preprocessor 104 is configured to process omics-based cell experimentation profile information and gene sequence and experimentation data (1) generated by the research and experimentation computers 118 and store the profile information (2) in the cell experimentation profiles database 112. In some of these embodiments, the data preprocessor 104 is also configured to format parametric values of one or more datasets from the gene sequencing data (1) using a standardized method and store the formatted datasets (3) in the big data database system 116.

In practice, experimenters, using computers 118-1, upload datasets from their research and experiments studies to the big database system 116 using command (1). In some embodiments, the datasets are sent to data preprocessor 104 and the datasets are initially normalized based on particulars of the study groups, treatments, pharmaceutical agents, predictor variables, output variables or any combination thereof, before being uploaded to big database system 116. After the datasets are normalized, data preprocessor 104 uploads the normalized datasets to big database system 116. In some embodiments, the datasets are uploaded to big database system 116 without being normalized. In some embodiments, the datasets are normalized at data preprocessor 104 after the datasets are downloaded by a researcher In the practical application, a researcher may be interested in a particular experimental pharmaceutical agent used in the treatment of a particular disease. The researcher, using computer 118-2, can enter general profile information related to one or more experimental studies, such as a study identifier or identifiers and one or more gene identifiers, and general analytics information, such as a request to measure dependencies between predictor and outcome variables related to statistical based feature-selection or measure triangulation between select variables in the dataset or datasets returned.

Computer 118-2 generates and sends command (4) comprising the general information to data preprocessor 104. Data preprocessor 104 constructs a detailed database query using the general information and the information stored in database 112. Database preprocessor 104 sends command (6) comprising the detailed database query to big database system 116 and big database system 116 sends one or more relevant datasets back in one or more responses (7).

Figure 2A:
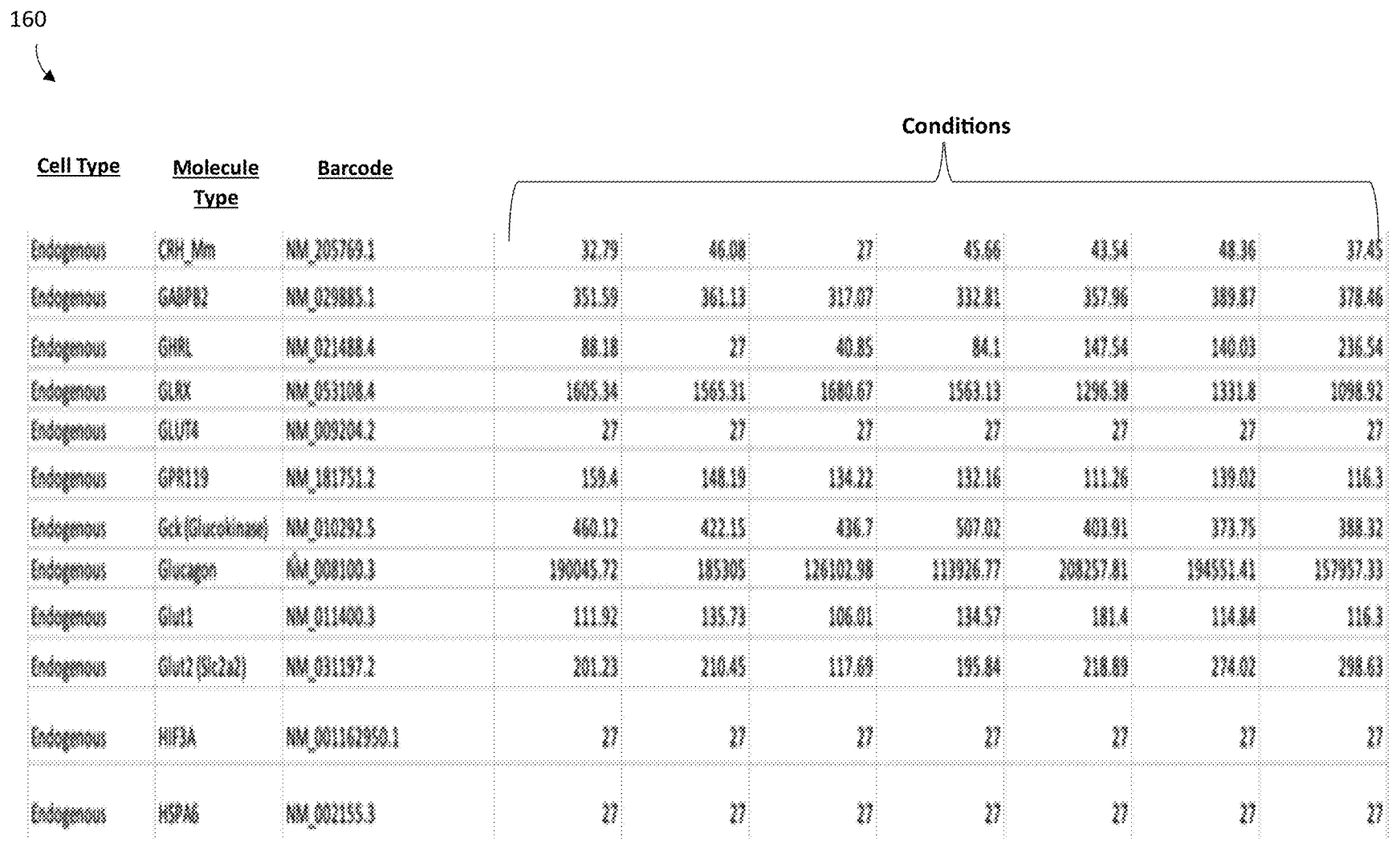

FIG. 2A is an illustration of table 160 comprising a small portion of a dataset relevant to an experimental study of the effects a particular pharmaceutical agent has on glucagon, a glucose transport gene, in treating a particular disease. Table 160 is a representative section of a table, e.g., a market exchange format (MEX), a comma separated value (CSV); or a tab separated value (TSV) table, uploaded to big database system 116, e.g. the GEO database.

In response to a query by data preprocessor 104, big database system 116 can return several datasets with each comprising millions of rows, or rows and columns, of data. In some embodiments, big database system 116 transforms uploaded tables into a format like that illustrated in FIG. 2B and returns the analyzed version (FIG. 2C). The transformed and analyzed version includes, e.g., a gene or protein symbol, a barcode index (cell identifier for example), and a value/transcript count. Regardless of which method is used, the amount of data returned precludes any kind of practical analysis without the aid of computers.

Figure 3:
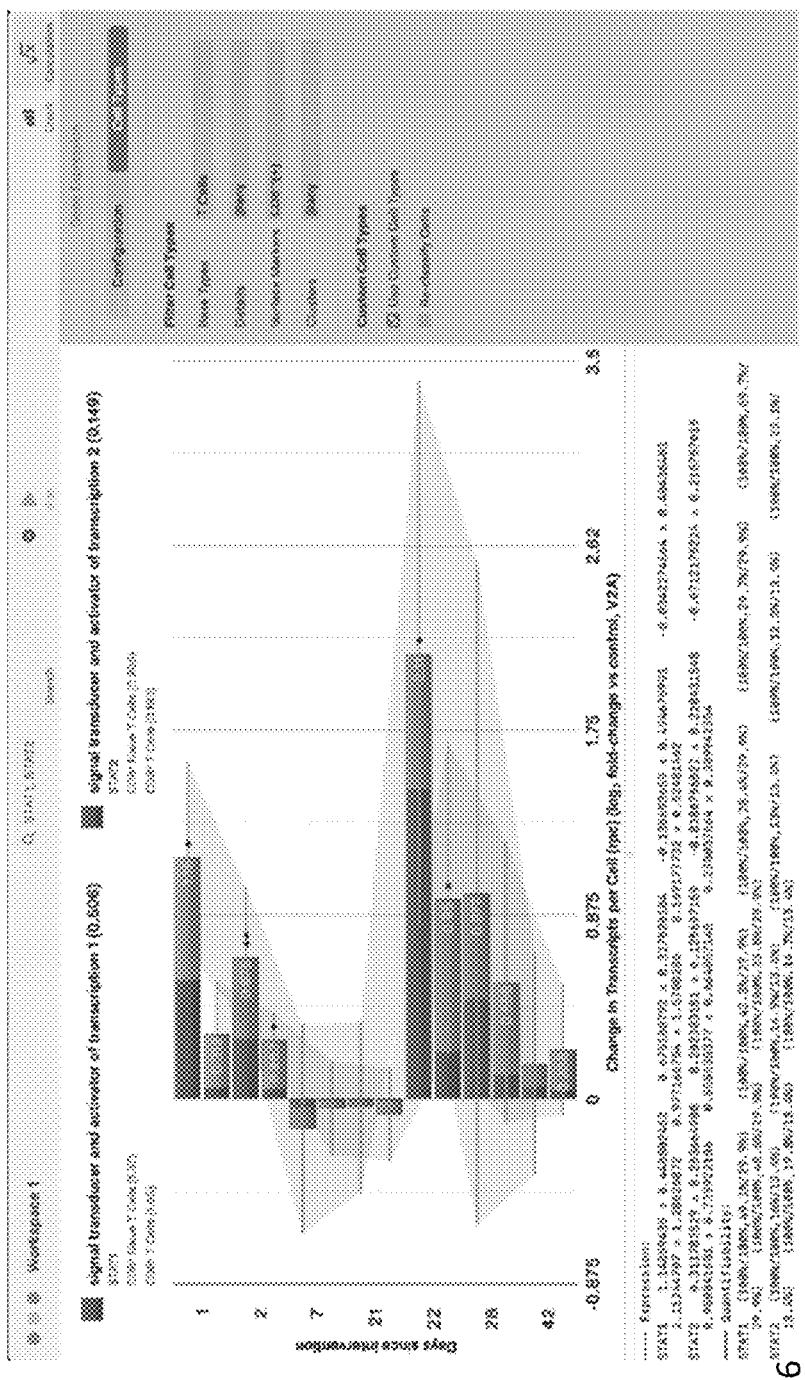

Data processor 104 normalizes the returned datasets using the experimentation, expression, and sequence profiles. FIGS. 2C-1 through FIGS. 2C-3 are illustrations of the normalized datasets. FIG. 3 is an example illustration of a graphical user interface of the normalized data. Normalizing the data using industry standard protocols results in improved expression data and research.

In the practical application, data preprocessor 104 transcodes the table from text to coded binary format. The conversion improves processing time when used for searching the table and performing analytics on the data therein. Data preprocessor 104 also constructs a detailed analytics command using the general information and the information stored in database 114. Database preprocessor 104 sends command (6) comprising the detailed analytics command to data analytics component 106. FIG. 3 is an interactive graphical user interface 180 comprising a graphical representation of the measurements generated by data analytics component 106 and form for configuring the analytics or for requesting new datasets to search and perform analytics against.

Figure 4:
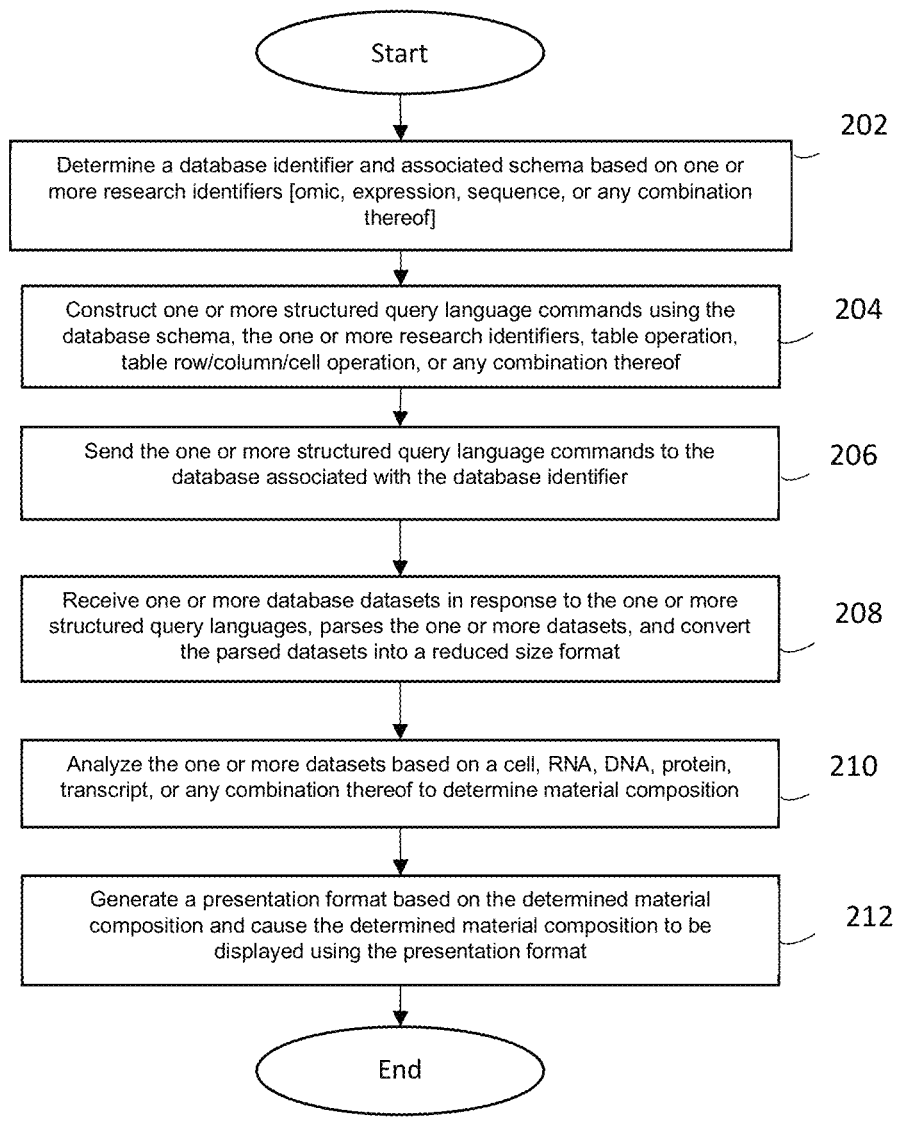
FIG. 4 is an illustration of a process for analyzing datasets associated with research and experimentation of organic materials, according to example embodiments.

FIG. 4 illustrates a flow diagram of a computer algorithm 200 for an analytics system 100 utilized for analyzing datasets associated with research and experimentation of organic materials, according to certain example embodiments. The algorithm 200 starts (instantiates) upon receiving a user activation command or other user input commands, such as a command comprising cell experimentation and analytics profile information.

At block 202, algorithm 200 determines a database identifier and associated schema based on one or more research identifiers. As an example, the identifiers can include an experimentation identifier, omics identifier, such as a genomic identifier, an expression identifier, a sequence identifier, or any combination thereof.

At block 204, algorithm 200 constructs one or more structured query language commands using the database schema, one or more research identifiers, table operations, table row/column/cell operations, or any combination thereof. At block 206, algorithm 200 sends the structured query language commands to the database associated with the database identifier. At block 208, algorithm 200 receives the database datasets in response to the one or more structured query language commands, parses the one or more datasets, and converts the parsed datasets into a reduced size format.

At block 210, algorithm 200 analyzes the datasets based on a cell, RNA, DNA, protein, transcript, or any combination thereof to determine material composition. At block 212, algorithm 200 generates a presentation format based on the determined material composition and causes the determined material composition to be displayed using the presentation format.

Figure 6:
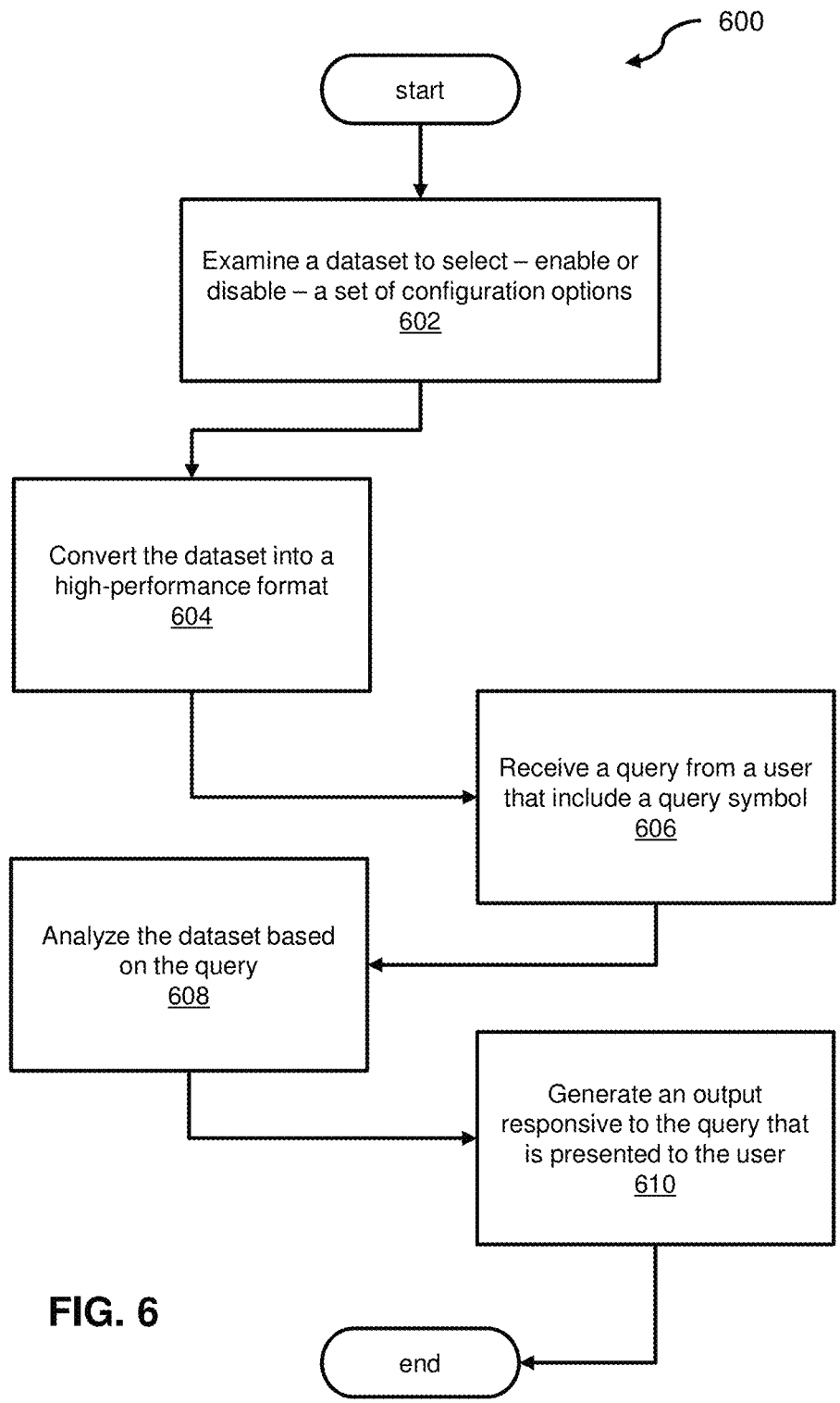
FIG. 6 is an illustration of a process for analyzing datasets associated with research and experimentation of organic materials, according to example embodiments.

FIG. 6 illustrates a process 600 for an analytics system 100 utilized for analyzing datasets associated with research and experimentation of organic materials, according to certain example embodiments. The process 600 starts (instantiates) upon receiving a user activation command or other user input commands, such as a command comprising cell experimentation and analytics profile information. At block 602, the process 600 examines a dataset to select, either by enabling and/or disabling, a set of configuration options from a plurality of configuration options. At block 604 the process 600 converts the dataset into a high-performance format. In accordance with some embodiments, the format may be computer readable binary format. At block 606, the process 600 receives a query, which may be from a user, that includes at least one query symbol. Based on the query, the process 600 accesses a database and searches for one or more datasets. At block 608, the process 600 analyzes the one or more datasets based on the query. At block 610, the process 600 generates an output that is responsive to the query. The process 600 presents the output to the user in a display in an appropriate format, which format is outlined herein.

Figure 7:
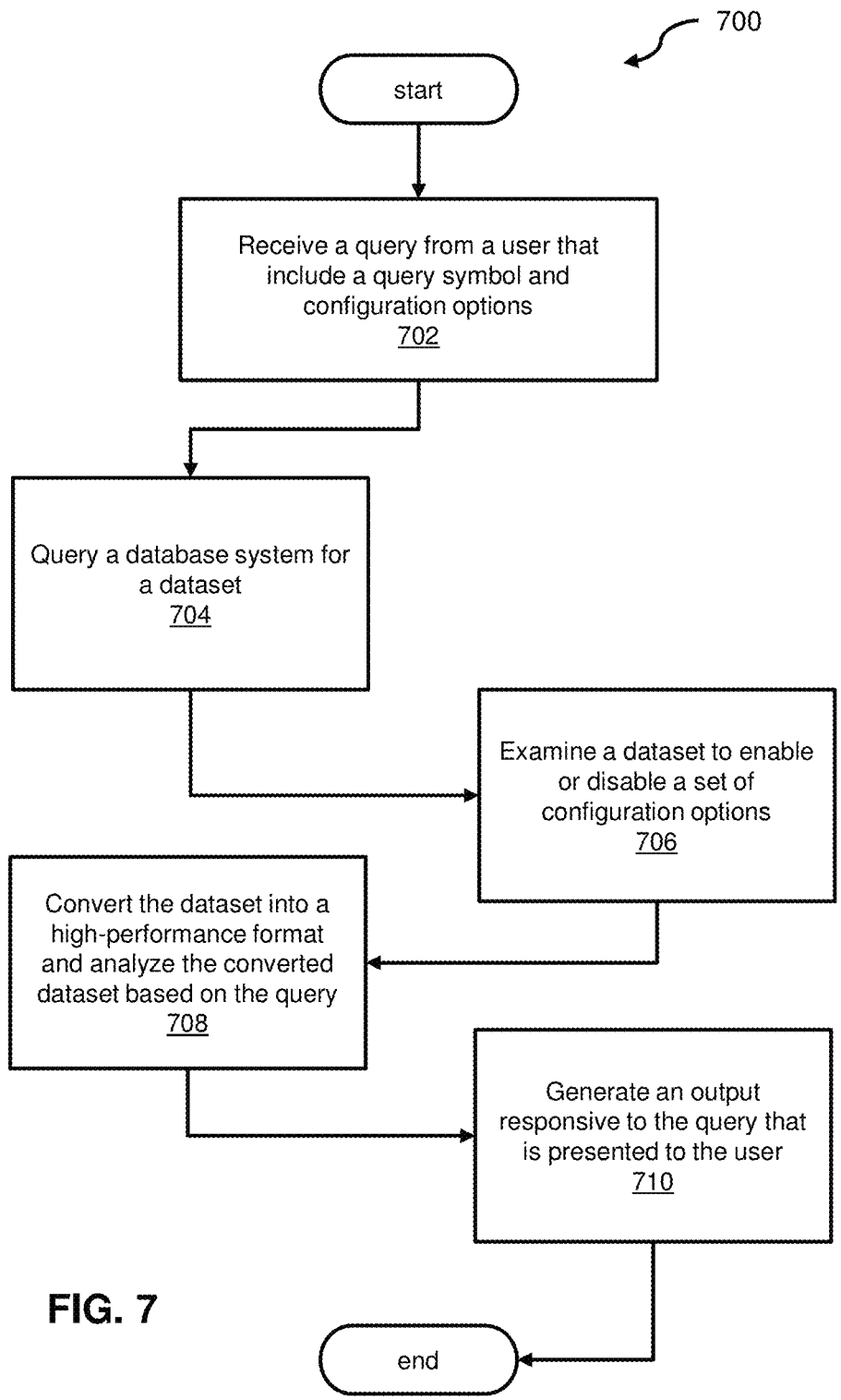
FIG. 7 is an illustration of a process for analyzing datasets associated with research and experimentation of organic material, according to example embodiments.

FIG. 7 illustrates a process 700 for an analytics system 100 utilized for analyzing datasets associated with research and experimentation of organic materials, according to certain example embodiments. The process 700 starts (instantiates) upon receiving a user activation command or other user input commands, such as a query that includes a command comprising cell experimentation and analytics profile information. At block 702, the process 700 receives a user-specified query containing one or more symbols and configuration options, which is provided by a user through the input device. At block 704, the process 700 queries a database system for a dataset from a database that includes biological measurement data. At block 706, the process 700 examines the dataset to determine which configuration options to enable and which configuration options to disable. The configuration options that are selected are from a plurality of configuration options and are based on/in response to the user-specified query. At block 708, the process 700 converts the dataset into a high-performance format for analysis. The process 700 then analyzes the dataset based on the query. At block 710, the process generates an output that is responsive to the query and displays the output to the user.

Figure 5:
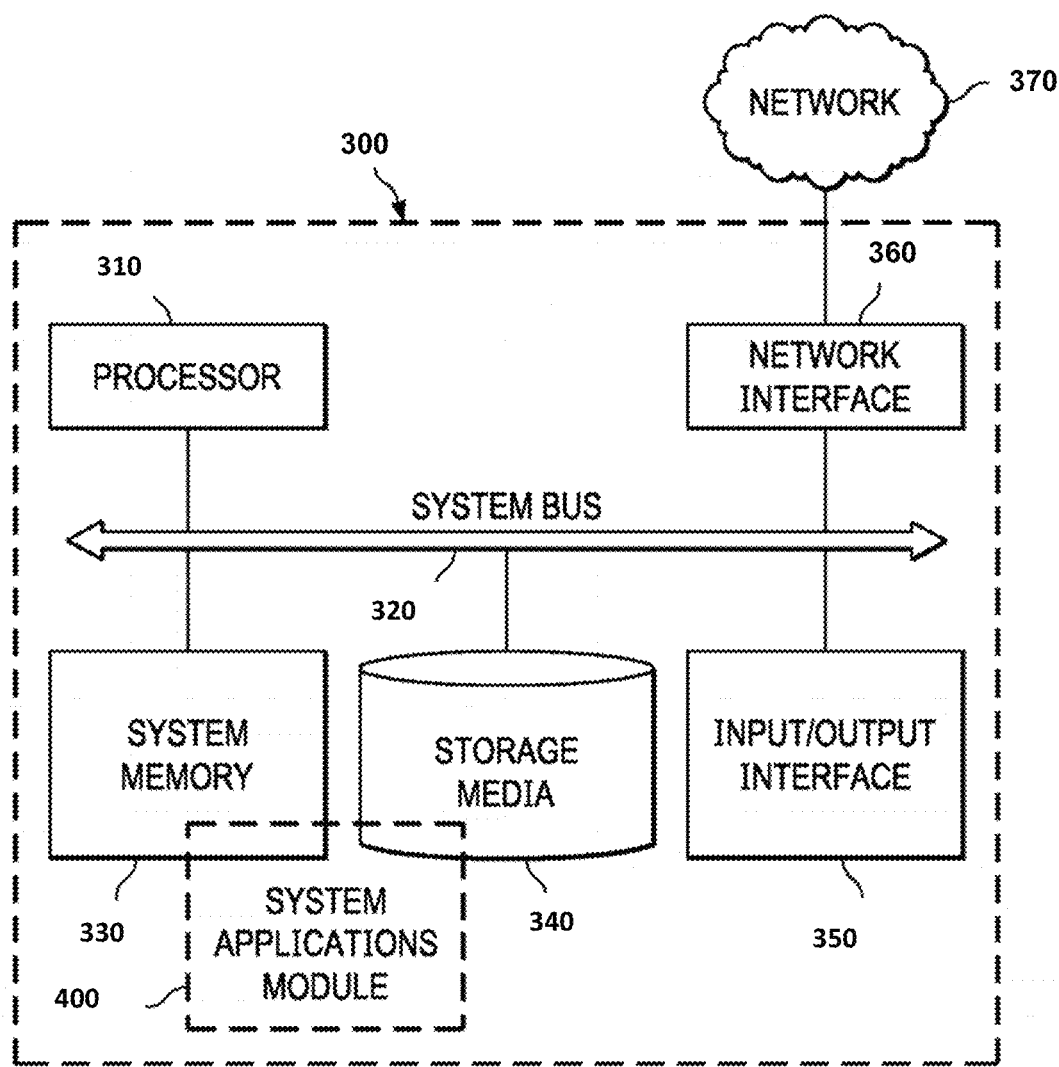
FIG. 5 is an illustration of a computing machine and a system applications module, according to example embodiments.

FIG. 5 illustrates a computing machine 300 and a system applications module 200, in accordance with example embodiments. Computing machine 300 can correspond to any of the various computers, mobile devices, laptop computers, servers, embedded systems, or computing systems presented herein. Module 200 can comprise one or more hardware or software elements designed to facilitate computing machine 300 in performing the various methods and processing functions presented herein. The computing machine 300 can include various internal or attached components such as a processor 310, system bus 320, system memory 330, storage media 340, input/output interface 350, a network interface 360 for communicating with a network 370, e.g., a loopback, local network, wide-area network, cellular/GPS, Bluetooth, WIFI, and WIMAX.

The computing machine 300 can be implemented as a conventional computer system, an embedded controller, a laptop, a server, a mobile device, a smartphone, a wearable computer, a customized machine, any other hardware platform, or any combination or multiplicity thereof. Computing machine 300 and associated logic and modules can be a distributed system configured to function using multiple computing machines interconnected via a data network and/or bus system.

The processor 310 can be designed to execute code instructions in order to perform the operations and functionality described herein, manage request flow and address mappings, and to perform calculations and generate commands. The processor 310 can be configured to monitor and control the operation of the components in the computing machines 300. The processor 310 can be a general-purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 310 can be a single processing unit, multiple processing units, a single processing core, multiple processing cores, special purpose processing cores, co-processors, or any combination thereof. According to certain embodiments, the processor 310 along with other components of the computing machine 300 can be a software based or hardware based virtualized computing machine executing within one or more other computing machines.

The system memory 330 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 330 can also include volatile memories such as random-access memory ("RAM"), static random-access memory ("SRAM"), dynamic random-access memory ("DRAM"), and synchronous dynamic random-access memory ("SDRAM"). Other types of RAM also can be used to implement the system memory 330. The system memory 330 can be implemented using a single memory module or multiple memory modules.

While the system memory 330 is depicted as being part of the computing machine, one skilled in the art will recognize that the system memory 330 can be separate from the computing machine 300 without departing from the scope of the subject technology. It should also be appreciated that the system memory 330 can include, or operate in conjunction with, a non-volatile storage device such as the storage media 340.

The storage media 340 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. Storage media 340 can store one or more operating systems, application programs and program modules, data, or any other information. Storage media 340 can be part of, or connected to, the computing machine. The storage media 340 can also be part of one or more other computing machines that are in communication with the computing machine such as servers, database servers, cloud storage, network attached storage, and so forth.

The applications module 400 can comprise one or more hardware or software elements configured to facilitate the computing machine with performing the various methods and processing functions presented herein. The applications module 400 can include one or more algorithms or sequences of instructions stored as software or firmware in association with the system memory 330, the storage media 340 or both. The storage media 340 can therefore represent examples of machine or computer readable media on which instructions or code can be stored for execution by the processor 310. Machine or computer readable media can generally refer to any medium or media used to provide instructions to the processor 310. A machine (hardware) or computer readable media associated with the applications module 400 can comprise a computer software product. It should be appreciated that a computer software product comprising the applications module 400 can also be associated with one or more processes or methods for delivering the applications module 400 to the computing machine 300 via a network, any signal-bearing medium, or any other communication or delivery technology. The applications module 400 can also comprise hardware circuits or information for configuring hardware circuits such as microcode or configuration information for an FPGA or other PLD. In one exemplary embodiment, applications module 100 can include algorithms capable of performing the functional operations described by the flow charts and computer systems presented herein.

The input/output ("I/O") interface 350 can be configured to couple to one or more external devices, to receive data from the one or more external devices, and to send data to the one or more external devices. Such external devices along with the various internal devices can also be known as peripheral devices. The I/O interface 350 can include both electrical and physical connections for coupling the various peripheral devices to the computing machine 300 or the processor 310.

The I/O interface 350 can be configured to communicate data, addresses, and control signals between the peripheral devices, the computing machine, or the processor 310. The I/O interface 350 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 350 can be configured to implement only one interface or bus technology. Alternatively, the I/O interface 350 can be configured to implement multiple interfaces or bus technologies. The I/O interface 350 can be configured as part of, all of, or to operate in conjunction with, the system bus 320. The I/O interface 350 can include one or more buffers for buffering transmissions between one or more external devices, internal devices, the computing machine, or the processor 310.

The I/O interface 350 can couple the computing machine to various input devices including mice, touchscreens, scanners, electronic digitizers, sensors, receivers, touchpads, trackballs, cameras, microphones, keyboards, any other pointing devices, or any combinations thereof. The I/O interface 350 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

Computing machine 300 can operate in a networked environment using logical connections through the network interface 360 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or analog communication media such as fiber optic cables, free-space optics, waveguides, electrical conductors, wireless links, antennas, radio-frequency communications, and so forth.

The processor 310 can be connected to the other elements of the computing machine or the various peripherals discussed herein through the system bus 320. It should be appreciated that the system bus 320 can be in processor 310, outside the processor 310, or both. According to some embodiments, any of the processors 310, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general-purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It is noted that, as used herein, the singular forms "a," "an" and "the" include plural referents unless the context clearly dictates otherwise. Reference throughout this specification to "one," "an," "certain," "various," and "cases", "examples" or similar language means that a particular aspect, feature, structure, or characteristic described in connection with the example is included in at least one embodiment of the invention. Thus, appearances of the phrases "in one case," "in at least one example," "in an example," "in certain cases," and similar language throughout this specification may, but do not necessarily, all refer to the same embodiment or similar embodiments. Furthermore, aspects and examples of the invention described herein are merely exemplary, and should not be construed as limiting of the scope or spirit of the invention as appreciated by those of ordinary skill in the art. The disclosed invention is effectively made or used in any example that includes any novel aspect described herein. Furthermore, to the extent that the terms "including", "includes", "having", "has", "with", or variants thereof are used in either the detailed description and the claims, such terms are intended to be inclusive in a similar manner to the term "comprising."

While various example embodiments of the present invention have been described above, it should be understood that they have been presented by way of example, and not limitation. It will be apparent to people skilled in the relevant art(s) that various changes in form and detail can be made therein. Thus, the present invention should not be limited by any of the above-described example embodiments but should be defined only in accordance with the following claims and their equivalents.

In addition, it should be understood that the accompanying figures are presented for example purposes only. The architecture of the example embodiments presented herein is sufficiently flexible and configurable, such that it may be utilized and navigated in ways other than that shown in the accompanying figures. Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method of using an analytics system for analyzing a multi-source biological information combined into a dataset including different biological samples represented by a plurality of different measurement values and text, the method comprising:
    examining the dataset to generate a plurality of configuration options that are presented to a user for selection through a user interface, wherein the plurality of configuration options for the dataset are derived based on the plurality of different measurement values and text, which includes at least one or more of biological parameters denoted by a symbol, concentration values, and sub-measurement for a sample denoted by a string;
    receiving a selection of a set of configuration options from the plurality of configuration options;
    converting the plurality of different measurement values and text into a high-performance format by transcoding the plurality of different measurement values and text to coded formats;
    receiving, from the user at the user interface, a query that includes at least one query symbol that defines one or more search constraints, for which the dataset is to be searched, and defines analysis information unique to the dataset;
    analyzing the dataset based on the query; and
    generating an output that is configured for display based on the set of configuration options and the output is responsive to the query by selecting a plurality of sub-measurements that are associated with metadata when the plurality of sub-measurements have nonzero values for the query.

2. The method of claim 1, wherein the dataset includes dataset kind.

3. The method of claim 1, wherein the dataset includes metadata.

4. The method of claim 1, wherein the dataset is genome sequences obtained from a database, including at least one of GEO database and/or Omics database.

5. The method of claim 1, wherein each measurement recorded in the dataset includes auxiliary data related to measurement associated with the dataset.

6. The method of claim 1, wherein each measurement recorded in the dataset includes a measured value for at least one biological parameter denoted by a symbol.

7. The method of claim 6, wherein measured value includes at least a count or a substance concentration or a peak value.

8. The method of claim 1, wherein measured values for a sub-measurement for a single cell that is denoted by a string, which includes at least one of a barcode or a UMI barcode, that is associated with additional metadata, which includes at least one of barcode metadata.

9. The method of claim 1, wherein the output is a visual presentation showing results for one or more user-specified test groups.

10. The method of claim 9, wherein the visual presentation includes, based on the query, one or more of:
    absolute value graphical representation;
    relative value graphical representation;
    average-to-average comparison graphical representation;
    value-to-average comparison graphical representation;
    value-to-value comparison graphical representation;
    value bars showing an average value of at least one analyzed test group;
    value labels;
    error bars showing a standard deviation of the at least one analyzed test group; and
    text denoting significance of the output for the at least one analyzed test group.

11. The method of claim 9, wherein a visual representation is provided on a display and the visual representation is based on the query and the set of configuration options.

12. The method of claim 1, wherein the query includes chart configuration and an optional normalization mode.

13. The method of claim 1 further comprising using criteria to determine if a measurement for a test group is to be included in an analysis.

14. The method of claim 13, wherein the criteria is defined to include at least one metadata value, enumeration types, and barcode metadata values.

15. The method of claim 1, wherein the step of analyzing further comprises the step of summing all sub-measurements for which barcode metadata satisfies criteria specified in the query.

16. The method of claim 1, wherein the dataset is in any format including at least of one:
    market exchange format (MEX);
    comma separated value (CSV); and
    tab separated value (TSV).

17. The method of claim 1, wherein the step of analyzing includes at least one of counting number of sub-measurements whose barcode metadata satisfies criteria specified in the query to generate a cell count chart.

18. The method of claim 1 wherein the step of analyzing includes calculating a percentage of sub-measurements with nonzero values for the query to generate a quantifiability chart.

19. The method of claim 1 wherein the step of analyzing includes dividing an analysis result for each query symbol of a plurality of query symbol by a result for the query to generate a correlation chart.

20. A system comprising:
    a processor;
    a memory in communication with the processor;
    an input device in communication with the processor; and
    a graphical-user display (GUI) in communication with the processor, wherein the memory stores code that is executed by the processor to cause the system to:
        examine a dataset to generate a plurality of configuration options that is presented to a user for selection, wherein the dataset includes multi-source biological data from different types of biological samples represented by a plurality of different measurement values and text, wherein the plurality of configuration options are derived based on the plurality of different measurement values and text and includes one or more symbols representing one or more of biological parameters, concentration values, and sub-measurement for a given sample denoted by a string;

receive a user-specified query including one or more symbols and a selection of a configuration option from the plurality of configuration options, which is provided by a user through the input device;

query a database including the dataset based on the user-specified query for a first dataset from the database that includes the multi-source biological data that satisfied the user-specified query;

convert the plurality of different measurement values and text into a high-performance format for analysis by transcoding the dataset from text to coded formats;

analyze the dataset based on the user-specified query; and generate an output that is configured for display based on the configuration option and the output is responsive to the user-specified query by selecting a plurality of sub-measurements that are associated with metadata, wherein sub-measurements have nonzero values for the user-specified query.

* * * * *